April 17, 1962  F. D. JOESTING  3,030,024
DOUBLE DUCT AIR CONDITIONING APPARATUS
Filed March 14, 1960
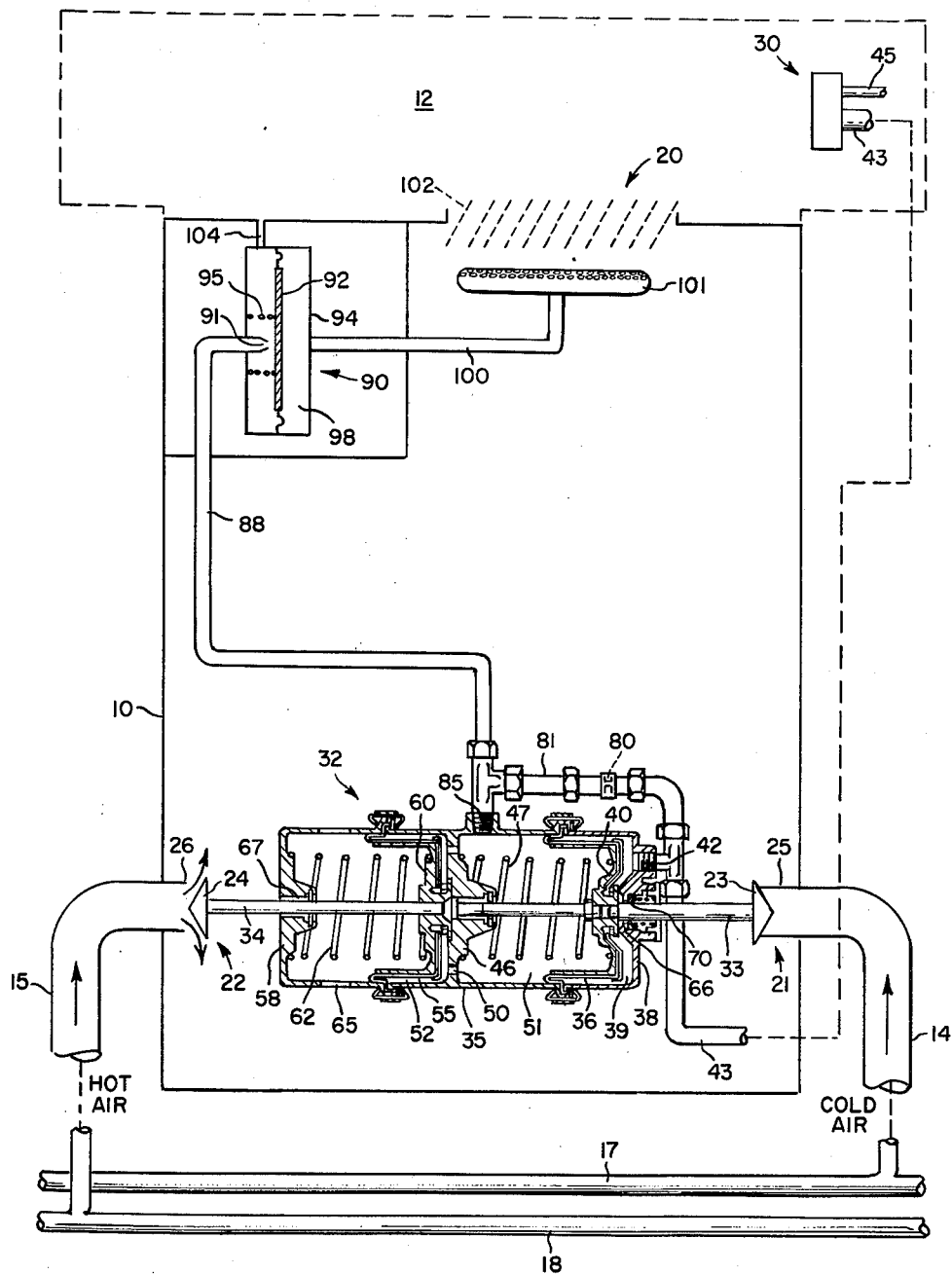
INVENTOR.
FREDERICK D. JOESTING
BY Joseph E. Ryan
ATTORNEY

United States Patent Office 3,030,024
Patented Apr. 17, 1962

3,030,024
DOUBLE DUCT AIR CONDITIONING
APPARATUS
Frederick D. Joesting, Park Ridge, Ill., assignor to Minneapolis-Honeywell Regulator Company, Minneapolis, Minn., a corporation of Delaware
Filed Mar. 14, 1960, Ser. No. 14,758
10 Claims. (Cl. 236—13)

My invention relates to air conditioning control apparatus applied to double duct mixing valves or air blender equipment, more particularly to an improved air conditioning control apparatus for air blender valves.

Apparatus of this type is known and used commercially. Blender controls which are supplied by dual ducts carrying hot or cold tempered air conditioning medium are finding acceptance and usage. Such equipment may be controlled electrically or pneumatically and in the latter field of control a disadvantage has been experienced in the number of conduits or piping to the individual mixing boxes. The present invention is directed toward an improved arrangement which requires only a single line from a main controlling stat to provide the control and source of energy for the entire equipment. This arrangement simplifies the installation and cost of the apparatus. Therefore the primary object of this invention is to provide a simplified air conditioning control apparatus of this type. A further object of this invention is to provide a double duct air conditioning control apparatus in which a single control source is utilized in conjunction with a remotely positioned space thermostat. These and other objects of this invention will become apparent from a reading of the attached description together with the drawing.

The single FIGURE of the drawing discloses a schematic or diagrammatic arrangement of the improved air conditioning apparatus.

The diagrammatic disclosure of my improved air conditioning control apparatus shows a blender or mixing box or chamber 10 disposed adjacent to and communicating with a space to be air conditioned indicated generally at 12. Box 10 has a pair of inlets 14 and 15 respectively adapted to be connected to sources of cold and hot air conditioning medium shown generally at 17 and 18 as double ducts. Box 10 also includes an outlet 20 designed to communicate indirectly or directly with the space 12 to be conditioned. The box 10 may include, if desired, fixed or adjustable louvers at the outlet 20, the louvers being indicated in phantom at 102. Inlets 14, 15 include valves 21, 22 respectively, the valves including a movable valve closure member 23, 24 cooperating with seating or sealing members 25, 26. The apparatus in the mixing chamber is designed to be controlled generally or primarily by a space thermostat indicated at 30 which may be positoined any place in the space as distinguished from being positioned in the box directly. Thus it will be later noted that aside from the connections at the inlets and possibly the outlet, the only other connection to the mixing box is the signal conduit to the thermostat, and the control apparatus, with the exception of the thermostat, is included in the mixing chamber or box 10.

The valves 21 and 22 are operated by a composite motor or pairs of motors indicated generally at 32, the motor having a pair of shafts 33, 34 respectively which extend to and are connected with the valve closure members 23, 24. Motor 32 includes a casing 35 having a first diaphragm or movable end wall member 36 positioned in and secured thereto, the diaphragm 36 defining with one end wall 38 of the casing a variable chamber 39. The diaphragm includes a supporting structure 40 to which the shaft 33 is secured. While I have shown a diaphragm herein, a piston may be utilized or other movable means to define with the end of the casing a variable chamber having an inlet 42 in the extremity thereof connected to a conduit 43 leading to the thermostat 30 and a source of control power indicated generally at 45. Also positioned within the casing 35 and bearing against a support wall or partition 46 is a spring or biasing member 47 which rests against the opposite surface of the diaphragm 36 or connecting member 40 to bias the diaphragm in a direction to reduce the size of the variable chamber 39 and urge the shaft from the casing 35. Partition 46 has a plurality of openings 50 therein such that a chamber 51 defined between the partition 46 and the diaphragm 36 actually communicates with a second chamber 52 defined by a second diaphragm or piston member 55 connected in the casing 35. Diaphragm or piston member 55 defines the second movable wall forming chamber 52 which communicates with or forms a part of the chamber 51 between the two diaphragms. The diaphragm 55 includes a support member 60 to which the shaft 34 connects. The portion of the casing 35 between an end wall 58 and the diaphragm 55 houses a second spring 62 which bears against the diaphragm 55 urging the same toward the partition 46. This area between the diaphragm 55 and the end wall 58 is vented, as at 65, to atmosphere. End walls 38 and 58 include supports and bearings 66, 67 respectively which journal the shafts 33, 34 with bearing 66 also including a seal member 70 to complete the chamber 39.

As indicated above, the control air source 45 for operating the motors is connected first to the thermostat 30 positioned in the space to be air conditioned. As will be later noted, this thermostat may be either reverse acting or direct acting, that is, will produce an increase or decrease of branch line pressure upon demand for heating or cooling depending upon which of the valves is to be controlled by the respective motors. The branch line pressure from thermostat 30 is connected through the conduit 43 to the chamber 39 of a first motor of the pair. Thermostat branch line pressure will act on the diaphragm 36 to urge the diaphragm against the tension or bias of the spring 47 and a pressure, later to be described, on the other side of the diaphragm to urge the shaft 33 of the first motor into the confines of the casing 35 operating to open the valve 21 associated therewith. Thermostat 30 in this disclosure is direct acting and will provide a decrease in branch line pressure upon a need for heat in the space. In this disclosure, valve 21 will be a cold air valve which will close with decreasing branch line pressure upon a call for heat. In the case in which the valve 21 is connected to the warm air duct, the thermostat will be reverse acting and will operate to open on a demand for heating. Thus with the arrangement shown herein, the thermostat is direct acting and upon a call for heat the branch line pressure reduces, throttling the cold air valve closed. The conduit 43 extends beyond the chamber 36 through a restriction indicated generally at 80, the restriction operating to set the pressure ratio between the thermostat and conduit 81, as will be later defined, and to hold the branch line pressure substantially constant in conduit 81 in a conventional manner. The thermostat 30 will operate between a maximum and minimum pressure with variation in temperature from a set condition, but the minimum branch line pressure upon the increase in space temperature is restricted to approximately five pounds per square inch with an approximate line pressure of 15 pounds p.s.i. from the source 45. The minimum output pressure for the thermostat 30, which is of the conventional bleed type, is fixed by orifice sizing. Thus the conduit 81 will have a pressure which may be varied between 0 and the pressure in conduit 43 which at its minimum would be 5 p.s.i. and through the controlled operation by a flow regulator, to be later defined, will operate the motors common to the variable chambers 51, 52.

The conduit 88 leading to the flow regulator 90 terminates in a nozzle 91 in a flow regulator which has cooperating therewith a diaphragm indicated at 92 positioned in a casing 94 of the regulator with a biasing means 95 positioned around the nozzle and urging the diaphragm away from the end of the nozzle. The diaphragm 92 forms with the chamber or casing 94 a pilot chamber 98 opposite the nozzle in which pressure is adapted to be varied in accordance with the total outflow from the mixing chamber at the outlet 20. Thus a conduit 100 leads to a box static sensing element 101 or pressure probe positioned at or near the outlet of the mixing box 10 or in a suitable position therein to respond to the maximum static pressure of the discharge. This pressure acting against spring 95 and downstream or space pressure, to be later described, will vary the position the diaphragm 92 with respect to the nozzle establishing a branch line pressure in conduit 88 leading to the chambers 52 and 51. Discharge from the nozzle of the flow regulator 90 will be through a conduit or tubing 104 which leads downstream of the outlet 20 of the mixing box to establish a downstream pressure reference against the opposite side of the diaphragm 92 to provide a pressure differential proportional to the total outflow from the box. Since the flow regulator is supplied with thermostat branch line pressure, a change in temperature will vary this pressure effecting therefore a change in the supply to the flow regulator 90 and to chambers 51 and 52. The response of the static pressure sensor 101 to mixing box pressure changes and in control of the regulator 90 is substantially slower than the effect of a thermostat branch line pressure change on the pressure in the conduit 88 in control of the motors 32 common to chambers 52 and 51. The relative sizing of the normal restrictions in the sensing tube 101 and the line restriction 80, and the lag in the pressure changes in mixing box pressure with valve changes permits thermostat branch line pressure changes to affect control of both motors substantially simultaneously to affect temperature control of the mixing box with volume control being affected by the flow regulator 90. Thus the thermostat will control both control pressure sources to the motors controlling the valves and since the box static pressure is applied to both motors it will also control both valves. The thermostat will desirably move both motors in the same direction, the same distance to differentially operate the valves, for a change at the thermostat, providing the static pressure regulator does not change. Also, if the temperature does not change, the static pressure regulator will similarly affect both motors either opening or closing them by the same amount to directly operate the valves. Of course, this will not be perfectly true in an actual case, because of the characteristics of the valve, the restrictions, and slight differences in diaphragm areas or springs, and other similar factors. In order for the control to function properly, the restriction 80 needs to be set so that the pressure in the box static branch line will be half the pressure in the thermostat branch line when the box static pressure regulators are in the middle of this control range. The normal operating range for the thermostat will be approximately 5 to 13 p.s.i. with an operating set point of approximately 8 to 10 p.s.i. under conditions of a normal supply pressure of approximately 14 to 15 p.s.i. Similarly, the range of pressure for the regulator will normally be 2 to 6 p.s.i. with a normal operating point of approximately 4 to 5 p.s.i. under these conditions. Thus for example, suppose the box is in a steady condition with 8 p.s.i. in the the thermostat branch line and 4 p.s.i. in the static regulator branch line and with the valves in a position for proper temperature and volume control. If the thermostat branch pressure increases to 10 p.s.i., and the static pressure regulator remains momentarily satisfied and does not move, then there will be 2 p.s.i. additional pressure pushing the cold air motor to the left, but the static branch line pressure has gone up to 5 p.s.i. so there will be an additional 1 p.s.i. pushing the cold motor to the right. The net result is an additional 1 p.s.i. pushing the cold air motor to the left. Likewise, there is an additional 1 p.s.i. pushing the hot motor to the left. Therefore, both motors will move to the left by the same amount. Now suppose the thermostat is satisfied at 8 p.s.i. and the static regulator branch pressure changes from 4 p.s.i. to 6 p.s.i. due to the effect of pressure variations in the ducts 17, 18. Then there will be an additional 2 p.s.i. pressure pushing the cold air motor to the right, and also 2 p.s.i. pushing the hot motor to the left, which will close both valves by an equal amount. Therefore, from a practical standpoint, the thermostat moves both motors together from right to left an approximately equal amount to differentially open and close the valves, and the static pressure regulator moves both motors apart or together an approximately equal amount to directly open and close the valves.

In considering this invention it should be remembered that the present disclosure is intended to be illustrative only and the scope of the invention should be determined by the appended claims.

I claim as my invention:

1. In air conditioning apparatus, a mixing box, a pair of inlets connected to said box and adapted to be connected to sources of hot and cold air conditioning medium respectively, valve means included in each of said inlets and adapted to control the flow of air conditioning mediums through the inlets from said sources to the interior of said box, outlet means included in said box and adapted to discharge a mixture of said air conditioning mediums therefrom to a space to be air conditioned, motor means positioned in said mixing box and including a pair of mechanically independent operating shafts extending therefrom connected respectively to said valves to operate the same, said motor including a casing having a first diaphragm therein connected to one of said shafts and defining with said casing a first variable chamber, a second diaphragm positioned in said casing and connected to the other of said shafts to operate said second valve, said first and second diaphragms and said casing defining a second variable chamber, biasing means included in said second chamber and urging said first diaphragm in a direction to decrease said first variable chamber, additional biasing means included in said casing and operating against said second diaphragm to decrease said second variable chamber, a control air source, space thermostat means connected to said source of control air and providing a control air pressure having a predetermined minimum pressure therefrom, conduit means connecting said control air pressure from said thermostat to said first variable chamber of said motor, additional conduit means connected to said first named conduit and including a restriction to establish a second control air supply of sufficient pressure with said minimum thermostat pressure applied to operate said motors, a static pressure sensor positioned in said mixing box and responding to pressure in said mixing box, flow regulator means connected to and controlled by said static pressure sensor, and third conduit means connecting said additional conduit means to said second variable chamber and said flow regulator means, said valve means being operated differentially by a control pressure determined by said thermostat and directly by a second control pressure determined by said flow regulator means.

2. In air conditioning apparatus, a mixing box, a pair of inlets connected to said box and adapted to be connected to sources of hot and cold air conditioning medium respectively, valve means included in each of said inlets and adapted to control the flow of air conditioning mediums through the inlets from said sources to the interior of said box, outlet means included in said box and adapted to discharge a mixture of said air conditioning mediums therefrom to a space to be air conditioned, motor means positioned in said mixing box and including a pair of mechanically independent operating shafts extending therefrom connected respectively to said valves to operate the same, said motor including a casing having a first movable member therein connected to one of said shafts and defining with said casing a first variable chamber, a second movable member positioned in said casing and connected to the other of said shafts to operate said second valve, said first and second movable members and said casing defining a second variable chamber, biasing means included in said second chamber and urging said first movable member in a direction to decrease said first variable chamber, additional biasing means included in said casing and operating against said second movable member to decrease said second variable chamber, a control air source, space thermostat means connected to said source of control air and providing a control air pressure having a predetermined minimum pressure therefrom, conduit means connecting said thermostat to said motor means to conduct said control air pressure from said thermostat to said first variable chamber of said motor means, additional conduit means connected to said first named conduit and including a restriction to establish a second control air supply dependent on said first named control air pressure and of sufficient pressure to operate said motor means for said valves, a static pressure sensor included near the outlet of said mixing chamber, a flow regulator connected to and controlled by said static pressure sensor, third conduit means connecting said second conduit to said second variable chamber and said flow regulator, one of said valve means being operated by a control pressure determined by said thermostat acting against said biasing means and a second control pressure determined by said static pressure sensor, and the other of said second valve means being operated by said second control pressure acting against said second named biasing means.

3. In air conditioning apparatus, a mixing box, a pair of inlets connected to said box and adapted to be connected to sources of hot and cold air conditioning medium respectively, valve means included in each of said inlets and adapted to control the flow of air conditioning mediums through the inlets from said sources to the interior of said box, outlet means inclded in said box and adapted to discharge a mixture of said air conditioning mediums therefrom to a space to be air conditioned, a composite motor positioned in said mixing box and including a pair of mechanically independent operating shafts extending therefrom connected respectively to said valves to operate the same, said motor including a casing having a first movable member therein connected to one of said shafts and defining with said casing a first variable chamber, a second movable member positioned in said casing and connected to the other of said shafts to operate said second valve, said first and second movable members and said casing defining a second variable chamber, biasing means included in said second chamber and urging said first movable member in a direction to decrease said first variable chamber, additional biasing means included in said casing and operating against said second movable member to decrease said second variable chamber, a control air source, space thermostat means connected to said source of control air and providing a control air pressure having a predetermined minimum pressure therefrom, conduit means connecting said thermostat to said motor to conduct control air pressure from said thermostat to said first variable chamber of said motor, additional conduit means connected to said first named conduit and including a restriction to establish a second control air supply which varies with thermostat control air pressure, means responsive to total outflow from the mixing box and connected to said additional conduit means to establish a second control pressure, third conduit means connected from said additional conduit means to said second variable chamber, one of said valve means being operated by the thermostat control air pressure acting against said biasing means and said second control pressure, and the other of said valve means being operated by said second control pressure acting against said second named biasing means.

4. In air conditioning apparatus, a mixing chamber, a pair of inlets connected to said chamber and adapted to be connected to sources of air conditioning medium at different temperatures, valve means included in each of said inlets and adapted to control the flow of air conditioning mediums from said sources to said chamber, an outlet from said chamber adapted to be connected to a space to be air conditioned, dual motor means for operating said valves positioned in said mixing chamber, one of said motor means having means defining a first variable chamber and connected to one of said valve means for operating the same, a second of said motor including means defining a second variable chamber connected to the other of said valve means and operative to control its position, a control air source, means responsive to the temperature of said space connected to said control air source and establishing a branch line pressure indicative of the need of operation of said valves and with a predetermined minimum pressure value, conduit means connected to said temperature responsive means and to said first variable chamber, further conduit means connected to said first variable chamber and including a restriction to establish a second control source sufficient to operate said motor means, means positioned in said box and responsive to the total outflow from said box to establish a second branch line pressure indicative of the need for a change in volume of outflow from said box, said last named means being connected to said second control air source and to said second chamber, and further connection means connecting said second chamber to a third chamber associated differentially with said first chamber, said first and second motor means including respectively biasing means operative against said control pressures in said first and second chambers.

5. In air conditioning apparatus, a mixing box, a pair of inlets connected to said chamber and adapted to be connected to sources of air conditioning medium at different temperatures, valve means included in each of said inlets and adapted to control the flow of air conditioning medium from said sources to said chamber, an outlet from said chamber adapted to be connected to a space to be air conditioned, a pair of motors connected respectively to said valves for operating the same, a control air source for actuating said motors, a space thermostat connected to said control air source and establishing a thermostat branch line pressure with a predetermined minimum indicative of the need for differential operation of said motors, conduit means connecting said branch line pressure to said one of said motors and through a restriction to establish a second control air source sufficient to operate said pair of motors, means responsive to the total outflow of said chamber and connected to said second control air source beyond said restriction and to the other of said motors to establish a box static control pressure to control said motors directly in proportion to the total outflow requirements of said chamber, said first motor being responsive to the difference between thermostat branch line pressure and box static control pressure offset by a fixed bias to control the first of said valves, said second motor being responsive to box static chamber pressure modified by thermostat branch line pressure changes and applied against a fixed bias to control the second of said valves.

6. In air conditioning apparatus, a mixing chamber, a pair of inlets connected to said chamber and adapted to be connected to sources of air conditioning medium at different temperatures, valve means included in each of said inlets and adapted to control the flow of air conditioning medium from said sources to said chamber, an outlet from said chamber adapted to be connected to a space to be air conditioned, a pair of motors connected respectively to said valves for operating the same, a control air source for actuating said motors, a space thermostat connected to said control air source and establishing a thermostat branch line pressure with a predetermined minimum indicative of the need for differential operation of said motors, conduit means connecting said branch line pressure to one of said motors and through a restriction to establish a second control air source sufficient to operate said motors, means responsive to the total outflow of said chamber and connected to said second control air source beyond said restriction and to the other of said motors to establish a box static control pressure and to control directly said motors in proportion to the total outflow requirements of said chamber, said first motor being responsive to difference between thermostat branch line pressure and box static control chamber pressure offset by a fixed bias to control the cold air valve, said second motor being responsive to box static control pressure applied against a fixed bias to control the warm air valve.

7. In air conditioning apparatus, a mixing chamber, a pair of inlets connected to said chamber and adapted to be connected to sources of air conditioning medium at different temperatures, valve means included in each of said inlets and adapted to control the flow of air conditioning medium from said sources to said chamber, an outlet from said chamber adapted to be connected to a space to be air conditioned, a pair of motors connected respectively to said valves for operating the same, a control air source for actuating said motors, a space thermostat connected to said control air source and establishing a thermostat branch line pressure with a predetermined minimum indicative of the need for operation of said motors, conduit means connecting said branch line pressure to one of said motors and through a restriction to establish a second control air source sufficient to operate said motors, means responsive to the total outflow of said chamber and connected to said second control air source beyond said restriction and to the other of said motor to establish a box static control pressure to control said motors in proportion to the total outflow requirements of said chamber, said first motor being responsive to difference between thermostat branch line pressure and box static control pressure offset by a fixed bias to control the first of said valves, said second motor being responsive to box static control pressure referred to against a fixed bias to control the second of said valves, and said thermostat modulating said thermostat branch line pressure between minimum and maximum values where the minimum value is always greater than zero pressure.

8. In air conditioning apparatus, a mixing chamber, a pair of inlets connected to said chamber and adapted to be connected to sources of air conditioning medium at different temperatures, valve means included in each of said inlets and adapted to control the flow of air conditioning medium from said sources to said chamber, an outlet from said chamber adapted to be connected to a space to be air conditioned, a pair of motors connected respectively to said valves for operating the same, a control air source for actuating said motors, a space thermostat connected to said control air source and establishing a thermostat branch line pressure with a predetermined minimum indicative of the need for operation of said motors, conduit means connecting said branch line pressure to one of said motors and through a restriction to establish a second control air source sufficient to operate said motors, and means responsive to the total outflow of said chamber and connected to said second control air source beyond said restriction and to a second of said motors to establish a box static chamber control pressure to control said motors in proportion to the total outflow requirements of said chamber, said first motor being responsive to difference between thermostat branch line pressure and box static control pressure offset by a fixed bias to control the cold air valve, said second motor being responsive to box static control pressure offset by a fixed bias to control the warm air valve, said valves operating differentially upon a change in thermostat branch line pressure and directly upon a change in box static control pressure.

9. In air conditioning apparatus, a mixing chamber, a pair of inlets connected to said chamber and adapted to be connected to sources of air conditioning medium at different temperatures, valve means included in each of said inlets and adapted to control the flow of air conditioning medium from said sources to said chamber, an outlet from said chamber adapted to be connected to a space to be air conditioned, a pair of motors connected respectively to said valves for operating the same, a control air source for actuating said motors, a space thermostat connected to said control air source and establishing a thermostat branch line pressure with a predetermined minimum indicative of the need for operation of said motors, conduit means connecting said branch line pressure to one of said motors and through a restriction to establish a second control air source sufficient to operate said motors, means responsive to the total outflow of said chamber and connected to said second control air source beyond said restriction and to a second of said motors to establish a static chamber control pressure to control said motors in proportion to the total outflow requirements of said chamber, means connecting said motors such that said first motor responsive to difference between thermostat branch line pressure and static chamber control pressure offset by a fixed bias to control the first of said valves, and said second motor is responsive to static chamber control pressure applied against a fixed bias to control the second of said valves, and means referencing said total flow responsive means to said space to be air conditioned and providing a passage for discharge therefrom.

10. In air conditioning apparatus, a mixing box, a pair of inlets connected to said chamber and adapted to be connected to sources of air conditioning medium at different temperatures, valve means included in each of said inlets and adapted to control the flow of air conditioning medium from said sources to said chamber, an outlet from said chamber adapted to be connected to a space to be air conditioned, a pair of motors connected respectively to said valves for operating the same, a control air source for actuating said motors, a space thermostat connected to said control air source and establishing a thermostat branch line pressure with a predetermined minimum indicative of the need for operation of said motors, conduit means connecting said branch line pressure to said one of said motors and through a restriction to establish a second control air source sufficient to operate said motors, means responsive to the total outflow of said chamber and connected to said second control air source beyond said restriction and to the other of said motors to establish a box static control pressure to control said motors in proportion to the total outflow requirements of said chamber, and means connecting said motors such that said first motor is responsive to the difference between thermostat branch line pressure and box static control pressure offset by a fixed bias to control the first of said valves and said second motor is responsive to box static chamber pressure modified by thermostat branch line pressure changes and applied against a fixed bias to control the second of said valves.

References Cited in the file of this patent

UNITED STATES PATENTS

| 1,972,766 | Ewald | Sept. 4, 1934 |
| 2,793,812 | McDonald | May 28, 1957 |
| 2,815,915 | Salerno | Dec. 10, 1957 |